Feb. 16, 1937.  C. F. HAROLD  2,070,943
ICE MAKING MACHINE
Filed June 29, 1936  2 Sheets-Sheet 1
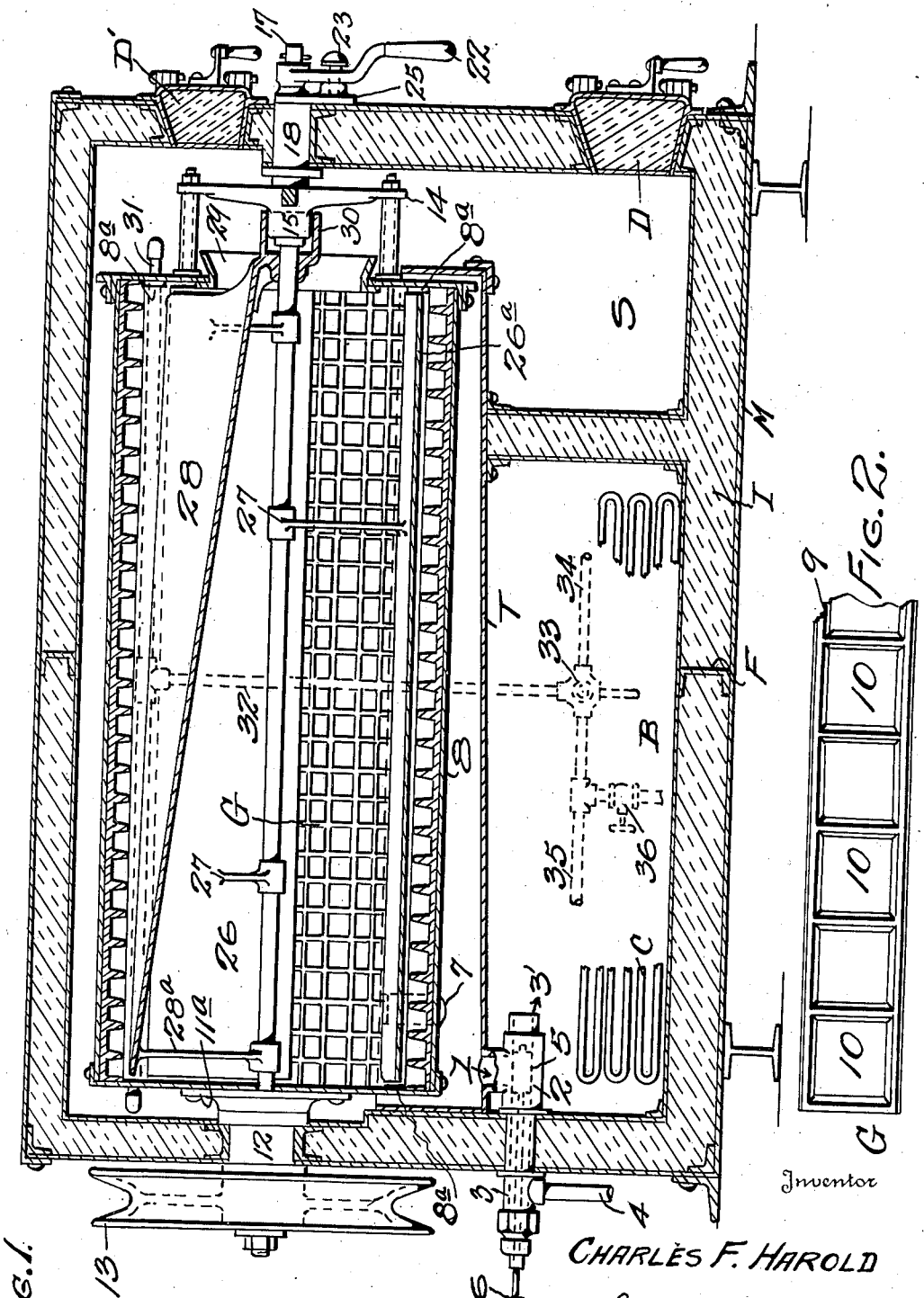
Inventor
CHARLES F. HAROLD
By Chas K. Davies & Son
Attorneys

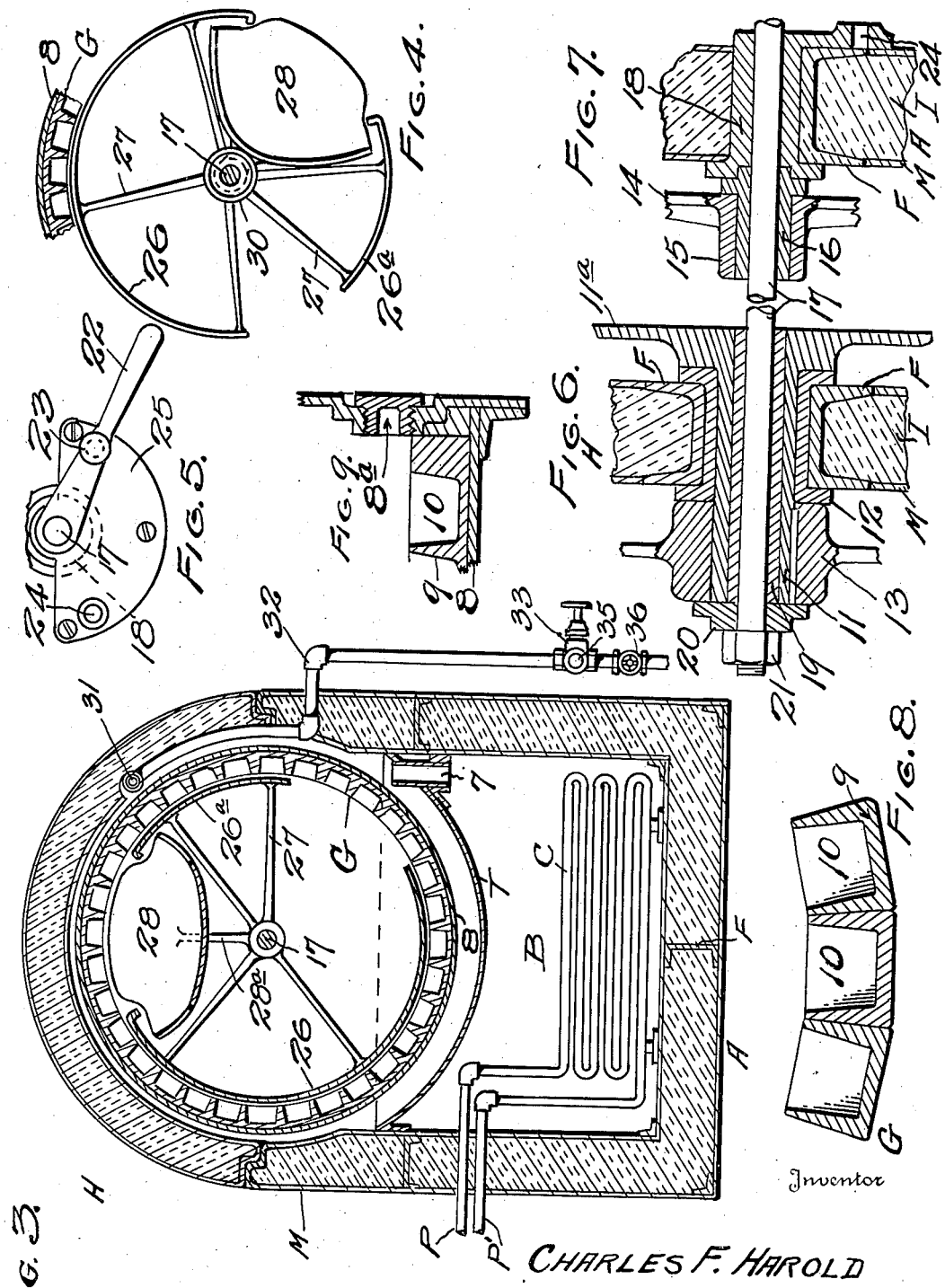

Patented Feb. 16, 1937

2,070,943

UNITED STATES PATENT OFFICE 2,070,943

ICE MAKING MACHINE

Charles F. Harold, Winchester, Va.

Application June 29, 1936, Serial No. 88,041

11 Claims. (Cl. 62—105)

My present invention relates to improvements in ice making machines which, as herein exemplified, is especially designed for the manufacture of cube ice, but it will be understood that the machine of my invention is adapted for the production of ice in other geometrical forms or shapes. For convenience of illustration and description I have here embodied the invention in a machine wherein the separate crystal cubes are formed or molded by accretion, or by the freezing of successive films of water in the molds or pockets of a grid.

In carrying out my invention, both for domestic ice-making and for commercial purposes, I employ a revolving carrier, which may be a cylindrical drum, having a supply of water confined therein, and an interior grid in which the cubes are formed, by accretion, as the drum and its grid revolve, to form clear, crystal cubes from purified water.

In the formation or manufacture of the crystal cubes according to my invention I am enabled to utilize a predetermined quantity of raw water in the interior of the rotary drum, which water is continuously and constantly agitated while the cubes are being frozen by accretion, to prevent inclusion of solids and air in the cubes. Thus, by the exclusion of solids and air contained in the water from the cubes, the latter are formed as clear crystals.

As the drum with its interior molds revolves, the molds of the grid are successively filled with water and a portion of the water is discharged from the molds with each revolution of the drum, thus causing a positive and effective agitation of the water, which prevents trapping of air as well as the trapping of solids from the water, in the cubes that are being frozen.

In the process of freezing I may employ any suitable refrigerant or freezing element, which, it will be noted is applied to the exterior of the drum or rotary grid-carrier, and, preferably the multiplicity of crystal cubes are with facility discharged from the carrier without displacing the mold-grid therefrom.

In the commercial ice-cube making machine illustrated, a minimum number of parts are required, and they are compactly arranged in a comparatively small space, and the machine which is simple in construction may readily be erected, and then operated at a comparatively low expense for maintenance. For domestic use where the capacity of the machine is considerably less than that illustrated, necessary changes and alterations are required from the illustrated construction and operation, but such changes and alterations are contemplated and may be made without departing from the principles of my invention.

It will be understood that the term "cube" is used for convenience in illustration and description, and I do not confine myself to the manufacture of a solid that is bounded by six equal squares in which all of its angles are right angles.

The invention consists essentially in the use of a rotary carrier and its interior mold rotating therewith, a supply of water within the carrier-mold, together with means for applying a refrigerant to the exterior of the carrier and means for thawing the completed cubes. In connection with these essential features I also utilize combinations and arrangements of parts for retaining the thawed cubes in their molds until ready for discharge, together with means for removing the cubes after they have been released, and for controlling the use of the refrigerant, as brine, and for controlling the use of the thawing medium, as water.

In the accompanying drawings I have illustrated one complete example of the physical embodiment of my invention, wherein the parts are combined and arranged according to one mode I have devised for the practical application of the principles of my invention, but it will be understood that changes and alterations are contemplated, within the scope of my appended claims, without departing from the principles of my invention.

Figure 1 is a longitudinal vertical sectional view of an ice-cube machine embodying my invention, with the discharge chute in position to discharge the frozen cubes from the machine.

Figure 2 is a plan view at one end of a mold-strip, a suitable number of these strips being employed in the formation of the mold-grid, which is mounted in the rotary carrier.

Figure 3 is a transverse, vertical sectional view of the structure of Figure 1, indicating the use of a separable top-half of the housing for the machine.

Figure 4 is a detail end elevation of the discharge chute and the guard, with the latter in position to retain the thawed cubes in their molds.

Figure 5 is a detail elevation at the exterior of the housing showing the hand lever which is employed to turn the chute and the guard from the position of Figure 3 to the position of Figure 4.

Figure 6 is a detail sectional view, enlarged, of the rotary drum-bearing at the drive end of the machine; and Figure 7 is a similar detail view at the right end of Figure 1.

Figure 8 is an enlarged detail transverse sectional view showing three of the mold strips of the mold-grid, in their relation one to another. Figure 9 is a detail of a drain plug.

In the assembly views I illustrate a rectangular housing A, and in Figure 3 the semi-circular top H of the housing is indicated as separable from the main body of the housing. The housing is erected upon a suitable frame F, and provided with interior and exterior sheathing as M, between which sheathings a suitable insulation element I is employed to insulate the interior of the housing from exterior heat.

As indicated in Figure 1, a brine bunker B is provided at the lower part or bottom of the housing, in which brine is contained, and the refrigerating coils C in this bunker are connected by the exterior pipes P and P' as suction and liquid lines to a refrigerating machine, not shown. A smaller bunker S is shown, separated by a suitable partition from the brine bunker, into which the frozen cubes are discharged, and may be stored, and access is had to the interior of the storage bunker through the insulated door D. An upper door D' is also shown in Figure 3 through which access may be had to the interior of the housing for inspection, and for the introduction of a hose by means of which the water to be frozen in cubes may be supplied to the rotary mold-carrier. These doors D and D', of course, are closed during the freezing operations, and the closed housing provides an insulated cover for the operating parts of the machine.

A brine tank T is supported within the housing and forms the top wall of the brine bunker, the tank being affixed against the inner face of the rear wall of the housing and extending toward the front wall, partially over the ice bunker S, and terminating short of the front wall. The tank is fashioned of suitable material, as sheet metal, and in cross section it forms a segment of a circle, as indicated in Figure 3, while in Figure 1 it will be seen that the bottom of the tank declines toward the rear end of the housing, where an outlet pipe 1 is provided. To the outlet pipe 1 a valve housing or casing 2 is connected, within the brine bunker, and a horizontally disposed pipe 3 is supported in and extends through the wall of the housing, from the valve casing, with an outlet 3' within the brine bunker, and a drain pipe 4 exterior of the housing. A slide valve 5 is mounted in the valve casing to close the outlet 1, and this valve is adapted to open the outlet 1 to the discharge nozzle 3' and close drain 4, or to open the outlet 1 to drain 4 and close the nozzle 3'. Thus, by pulling on the handle 6 of the valve stem, the outlet 1 is opened to the nozzle 3' in order that brine may be drained from the brine tank T into the brine bunker. By pushing on the stem 6 in Figure 1 the valve 5 closes the nozzle or port 3' and opens the outlet 1 to the drain pipe 4 for the purpose of draining from tank T the thawing-water after the latter has performed its functions in freeing the frozen cubes from the grid-carrier, or from the grid G.

As best seen in Figure 3 the brine tank is provided with a short, vertical overflow pipe 7 with its top edge just below the top edge of the tank T, and its lower edge opening into the brine bunker B. By means of this overflow pipe the level of the brine in the tank T is maintained at the desired point, and overflow of the brine is prevented from entering the storage bunker S.

The rotary carrier employed in the ice making machine may be of any desired shape, and therefore it will be understood that while I have shown the carrier as a cylindrical drum 8, the drum may be fashioned in other suitable shape or shapes. The drum extends longitudinally of the housing and revolves on a horizontal axis, 10 and the grid, indicated as a whole by the letter G, forms an interior lining for the drum, which, as indicated is closed at its rear end, but provided with a front opening, as will be described.

For convenience in assembling the grid in the drum, the grid may be made up of a number of longitudinally extending strips 9 in which are fashioned spaced and separated pockets or molds 10, and the side walls of the strips, as best seen in Figure 8, are arranged on radial lines, from the center of the drum, in order that the strips may be keyed in place, and retained within the interior of the drum, as in an arch. These strips extend the full length of the drum, and the molds or pockets form a multiplicity of recesses in which the cubes, by accretion, are frozen. As previously explained, the cubes are not exact geometrical figures, due to the fact that the walls of the molds are slightly tapered, in order that the cubes may fall by gravity from the molds, after the frozen cubes have been thawed. In the drawings, for convenience of illustration, the molds are exaggerated as to size, and it will be understood that these molds may be provided in shapes other than that of a cube.

Preferably, the cylindrical drum is fashioned of sheet metal, and the grid is fashioned in some instances of rubber, but it will be understood that any other suitable material may be employed in the manufacture of these elements of the machine.

The rotary drum is located in the upper part of the housing, above the brine tank T, and concentric with the round wall of the tank, the parts being related so that the lower exterior face of the drum will pass through the brine contained in the tank, and it will be noted that the major portion of the exterior surface of the drum is spaced from the interior face of the housing, in order to permit the brine to be sprayed on the exterior of the drum as will be explained.

The drum may be journaled to revolve on its horizontal axis by the use of suitable bearings in the walls of the housing, and as best seen in Figure 6 and Figure 1, the drum, at its drive-end is provided with a comparatively long tubular journal 11 which is rigidly attached, by means of an attaching flange 11a, to the end of the drum, the tubular shaft being journaled in a bearing 12 mounted in the wall or frame of the housing, with the free end of the journal projecting outside of the housing. At its extreme outer end, the journal is provided with a pulley 13 keyed or otherwise secured to the journal, and suitable driving means are employed, as a belt, for slowly revolving the drum through the pulley.

At its front end, the drum is provided with a spider frame 14 rigidly attached thereto as by tie bolts and tubular guards or ferrules, and in Figure 7 it will be seen that the spider frame has an integral hub 15 that is journaled to revolve on a bushing 16, which is mounted on a spindle 17 that is journaled in a bearing 18 rigidly mounted in the frame F of the housing.

As thus arranged, the rotary drum is supported at opposite ends and revolves in bearings mounted in the front and rear walls of the housing. The spindle 17, which extends along the longitudinal center of the drum, with its ends projecting to the exterior of the housing, does not revolve with the drum, but has a supplemental rotary, or rocking movement, in the bearing 18 at the front of the housing, and in a bushing 19 at the rear end of the housing. This bushing 19 as indicated in Figure 6 is located within the tubular journal 11 of the drum, and its outer end terminates flush with the outer face of the hub of the pulley 13 so that a cap 20, and nut 21 may be employed to secure these bearing parts in operative position. The nut is conveniently threaded on the threaded end of the spindle, and at the front end of the housing, the spindle may be retained in suitable manner, as by a cotter pin.

As best seen in Figures 1 and 5 the spindle is provided with a hand lever 22 located at the front exterior of the housing, and a pin or bolt 23 is shown as passing through a hole in the lever and seated in one of two sockets 24 provided in the exterior plate 25 that is fashioned integral with the bearing block 18. By means of the hand lever the spindle may be rocked into one of two positions to change the location of a guard 26, 26a, and a discharge chute 28, which members are rigidly mounted on the spindle and located within the interior grid or mold of the drum.

The guard is designed to prevent displacement of the frozen cubes, by retaining them in their molds, until they are ready to be discharged from the drum, and the discharge chute, of course is designed to discharge the thawed and released cubes into the storage bunker S through a flanged ring or opening 29 at the discharge end of the drum.

As indicated in Figures 3 and 4, the guard is of generally cylindrical shape, but composed of two spaced sections 26 and 26a which are supported from the spindle by a suitable number of radial arms 27, and the larger segmental portion 26 of the guard, in the position of Figure 4 occupies the upper half of the interior of the cylindrical grid, with the outer face of the guard adjacent the inner face of the grid. In the position of Figure 4, the guard prevents displacement of the thawed or defrosted cubes, and the guard is retained in this position by means of the lever 22 and pin 23 in one of the sockets 24. The open spaces between adjoining edges of the guard-sections permit freedom of movement of water, that is contained in the interior of the grid-carrier, as the drum revolves, and these sections of the guard prevent excessive or undue splashing of the water caused by the slowly revolving grid.

A predetermined quantity of water is supplied, by means of hose, through the open door D', and through the opening 29 at the front end of the drum, and the supply is brought up to a desired or suitable level within the drum, the molds in the lower part of the grid, of course being filled with water before the carrier or drum is revolved. When the drum is revolved, anti-clockwise in Figure 3, the molds or pockets passing through the water in the lower part of the mold-carrier, pick up a supply of water and carry the water upwardly, spilling the major portion from the pockets. By applying a refrigerant to the exterior surface of the drum, these successive films of water that are collected by the upwardly turning are frozen in the molds, and thus by accretion, the complete cube is formed in a mold-pocket.

The chute 28, which is rigidly mounted on the spindle by radial arms 28a, declines from the rear end of the grid toward the cube-discharge opening 29, and the chute is held in position of Figure 3 while being employed to discharge the cubes; but during the formation of the ice-cubes this chute is in the position of Figure 4, i. e. located below the center line of the grid. As indicated in Figure 1 the lower end of the chute projects through the flanged opening 29 of the drum, and preferably a small cylindrical guard or ring 30 is fashioned rigid with the discharge end of the chute, to prevent impact of the cubes against the spider-hub 15.

In addition to the refrigeration caused by submerging the lower exterior face of the drum in the brine of the tank T, I also prefer to spray the refrigerant or brine against the exterior part of the drum, above the brine tank. For this purpose I utilize a spray pipe 31 having suitable nozzles or holes to discharge the brine against the adjacent outer face of the rotary drum. This pipe, as indicated by dotted lines in Figure 1 extends the full length of the drum and is located in the upper part of the housing, and an upright feed pipe 32 feeds the brine to the spray pipe in order that the brine may be sprayed on the exterior of the revolving drum, after which the sprayed brine falls by gravity into the brine tank T below the drum.

As indicated in Figures 1 and 3 the feed pipe 32 is provided with a two-way valve 33 at one side of which is connected the brine pipe 34 leading to a suitable source of supply, and at the other side of the valve a water pipe 35 is connected and provided with a drain pipe and valve 36.

By this arrangement of piping, it will be seen that the valve 33 may be manipulated to introduce brine to the spray pipe 31 as a refrigerant during the freezing period, and then, after the multiplicity of molds have been filled with frozen cubes, the valve 33 is turned to shut off the brine and open feed pipe 32 to the water pipe 35. Thawing-water, from a suitable source, is then forced under pressure through water pipe 35, valve 33, and feed pipe 32 to the spray pipe 31, and the thawing-water is sprayed on the exterior of the revolving drum. The water for thawing or defrosting the cubes is supplied at a suitable temperature to thaw, melt, or defrost the cubes from frozen contact with the molds, and during this defrosting operation the guard-section 26 is held in position of Figure 4 to prevent displacement of the defrosted cubes in the upper portion of the drum.

After defrosting, the supply of thawing-water is cut off, and the water is drained, as by valve 36, after which the valve 33 is turned to again supply the brine for the spray during the next freezing operation.

The thawing-water, or fresh water flowing in a film over the exterior of the drum falls by gravity into the brine tank T and this water, together with the brine in the tank, may be discharged into the brine bunker for refrigeration, or if desired, the entire contents of the tank T may be drawn off through the drain pipe 4.

When the cubes are freed from frozen contact with their molds and ready for delivery, the spindle is rocked to bring the chute 28 to position of Figure 3, and the cubes fall by gravity from the upper portion of the grid into the declining chute, and these cubes slide by gravity down the chute and are delivered or discharged into the storage bunker S. The carrier is slowly revolved to bring successive portions of the grid into discharge position over the chute, until all of the pockets or molds have been emptied of their contents into the chute.

In the event that it becomes necessary to cleanse the interior of the mold carrier from accumulated impurities that are separated from the water by agitation during the process of freezing the water, I provide the mold carrier with a suitable number of removable closures, which, as indicated in Figure 9 may be screw plugs 8a, threaded into the ends of the cylinder of the mold carrier at suitable points. Thus, in a machine of large capacity, after the cubes have been frozen, and preferably, while the thawing water is being applied to the exterior of the carrier through spray pipe 31, the impurities that have been excluded from the crystal cubes may be washed out and drained into the tank T, and thence through the outlet 1 and drain pipe 4. A number of the screw plugs are provided at each end of the mold carrier, and as indicated these plugs close openings that are located at the inner level of the mold or grid G. With the door D' open, and the mold carrier in stationary position, a hose is inserted through the doorway and through ring 29 to the interior of the carrier, and one (or more) of the screw plugs is removed, thus opening the interior of the grid to the interior of the tank T. The mold carrier is, of course turned to position so that the plug-opening is at the lowest point of the carrier, so that when clean cold water is sprayed from the previously inserted hose, the interior of the mold-carrier is flushed out, and the water drained through a plug-opening, into the tank T and disposed of through the drain pipe 4, together with the thawing water that has been sprayed on the exterior of the carrier. This flushing operation of the interior of the mold-carrier may be accomplished at intervals as required during the ice making process, in order that the supply of water, within the mold carrier, to be frozen by accretion may be maintained at all times in a maximum degree of purity, and the accumulation of impurities within the mold carrier is prevented.

It will be understood that the charge, or supply of water furnished to the interior of the mold carrier does not drop below 32 degrees, that is, the bulk of the charge always remains above the freezing point, while on the other hand, the successive accretions of water from the bulk, picked up as the mold carrier revolves or oscillates, are congealed in the grid or mold, due to the application, as by spraying, of the refrigerant to the major portion of the exterior of the carrier. As indicated in the drawings, approximately one-fourth of the exterior of the area of the revolving carrier is immersed in the brine tank, while the remainder of the exterior area of the carrier is subjected to a much colder, and freezing temperature, but this proportion may of course be changed to suit varying conditions. By this accretive process in the formation of the crystal cubes, comparatively small quantities of water are constantly removed from the supply or bulk, and successively frozen to build up the cubes, and in this manner crystallization is accomplished much faster than where the ice is frozen in bulk.

It will be noted that my process of freezing by accretion is accomplished by applying the refrigerant, only, to the exterior face of the outer wall of the drum and through said wall directly, and, only, to the side (bottom wall) of the mold-recess that is in direct contact with the drum. By accretion, the successive films of water are frozen on the flat surface as it is being built up from the flat side (or bottom wall) of the mold that is in contact with the exterior wall of the drum. The crystal cube is thus formed by accretion, the flat films of water successively taken into the mold-recess being successively frozen to build up the cube.

Due to the fact that the size of the cube is increased by freezing successive films of water, it will be apparent that all solids contained in the water taken up by the mold-recess will fall away from the film as the cube is being formed, and therefore no solids can be trapped in the cube.

It is well known to those familiar with ice making that when water is frozen in bulk, as by application of the refrigerant to three sides and the bottom of a mold, the solids are trapped in the water and frozen in a core in the mold, and further, when the water is frozen in bulk, excess ice is formed at the edges of the ice-molds or mold-recesses, which excess ice must be removed.

By my process of freezing the water in successive, flat films, all solids and other undesirable matter are excluded from the crystal cube, the formation of a core is eliminated, and excess ice-formations are avoided.

Having thus fully described my invention, what I claim as new and desire to secure by Letters Patent is:—

1. In an ice making machine of the accretion type, the combination with a rotary carrier having an interior mold and means for supplying water to said mold, of exterior means for applying a refrigerant to the carrier, exterior means for applying a thawing means to the carrier to free the ice-formations from frozen contact with the mold, adjustable means for retaining the freed ice-formations in the mold, and means for discharging the ice-formations from the carrier.

2. In an ice making machine of the accretion type, the combination with a rotary drum having an interior mold and means for supplying water to said mold, means for applying a refrigerant to the exterior of the drum, and means for applying a thawing-medium to the exterior of the drum to free ice-formations from frozen contact with the mold, of a guard within the mold to prevent displacement of the freed ice-formations, a discharge chute within the mold, and means for moving said guard and chute to position for discharge of the ice-formations from the drum.

3. In an ice making machine of the accretion type, the combination with a brine tank, a rotary drum partially submerged therein, and an interior mold within the drum and means for supplying water to said mold, of means for applying a thawing-medium to the exterior of the drum to free ice formations from the mold, a guard within the mold to prevent displacement of the ice-formations, a discharge chute rigid with the guard, and means for moving said guard and chute to position for discharge of the ice formations from the drum.

4. In an ice making machine of the accretion type, the combination with a cylindrical drum having an interior mold, a cylindrical guard mounted within the mold comprising spaced sections, a discharge chute mounted rigidly with the guard, and means for adjusting said guard and chute.

5. In an ice making machine, the combination with a housing forming a brine-bunker and a separated ice-bunker, and a brine-tank mounted in the housing having an outlet to said brine bunker, of a rotary mold-carrier mounted in the housing above and partially submerged in the brine tank, and means for applying a thawing-medium to the exterior of the mold-carrier.

6. In an ice making machine, the combination with a tank, and a rotary mold adapted to freeze interior ice-formations, and partially submerged in a liquid refrigerant in the tank, of means for applying a liquid refrigerant to the non-submerged exterior of the mold and for conveying said liquid refrigerant toward the bottom of the tank, and means for applying a thawing medium to the exterior of the mold to free the ice formations from frozen contact with the mold.

7. In an ice making machine, the combination with a tank, and a rotary mold therein having a multiplicity of interior recesses, of means within the tank for applying a liquid refrigerant to the upper, exterior, portion of the mold whereby said refrigerant is collected by gravity in the bottom of the tank in contact with the exterior of the mold, means for applying a thawing medium to the exterior of the mold to free ice-formations from the recesses, and means for discharging the freed ice-formations from the mold.

8. In an ice making machine, the combination with a liquid refrigerant tank, a rotary carrier mounted in the tank with its lower portion submerged in the liquid refrigerant of the tank, and a mold having a multiplicity of interior recesses, within the carrier, of means within the tank for applying a liquid refrigerant to the upper, non-submerged, portion of the carrier whereby said refrigerant is collected by gravity in the bottom of the tank, means for withdrawing the liquid refrigerant from the tank, and means for applying a liquid-thawing-medium to the exterior of the mold to free the ice formations from the interior recesses.

9. In an ice making machine, the combination with a tank, and a rotary mold therein having interior, recesses, of means for applying a liquid refrigerant to the exterior of the mold whereby said refrigerant is collected by gravity in the tank, means for withdrawing the collected refrigerant from the tank, and means for applying a thawing-medium to the exterior of the mold to free ice-formations from the recesses.

10. In an ice-making machine, the combination with a brine-tank and a rotary mold carrier partially submerged therein, of a spray-pipe mounted within the tank exterior of the mold carrier, means for supplying a liquid refrigerant to the spray-pipe whereby said refrigerant is collected by gravity in the bottom of the tank, a feed-pipe connected with the spray-pipe, a brine-pipe and a water-pipe connected with the feed-pipe, a valve connected with the feed-pipe for controlling admission of water and brine to said feed-pipe, and means for withdrawing liquids from the tank.

11. In an ice-cube making machine, the combination with a rotary mold having interior recesses adapted to pick up successive films of water, of exterior means for applying a refrigerant only to the exterior portion of the mold occupied by said films, exterior means for thawing the cubes in said mold, adjustable means for retaining the thawed cubes in the mold, and means for releasing the thawed cubes from the mold.

CHAS. F. HAROLD.